US008466588B2

(12) United States Patent
Huang

(10) Patent No.: US 8,466,588 B2
(45) Date of Patent: Jun. 18, 2013

(54) HEAT DISSIPATING DEVICE OF AN ELECTROMOTOR

(75) Inventor: Chin-Chuan Huang, Kaohsiung County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 294 days.

(21) Appl. No.: 12/881,647

(22) Filed: Sep. 14, 2010

(65) Prior Publication Data

US 2011/0074234 A1    Mar. 31, 2011

(30) Foreign Application Priority Data

Sep. 30, 2009  (TW) ................................ 98133145 A

(51) Int. Cl.
*H02K 9/00*  (2006.01)
(52) U.S. Cl.
USPC .............................................. 310/54; 310/90
(58) Field of Classification Search
USPC ................... 310/54, 57, 62, 63, 90; 417/902, 417/423.14; 415/213.1
See application file for complete search history.

(56) References Cited

U.S. PATENT DOCUMENTS

| 4,367,413 | A | * | 1/1983 | Nair | 290/52 |
| 5,220,231 | A | * | 6/1993 | Veronesi et al. | 310/90 |
| 5,408,155 | A | * | 4/1995 | Dickinson et al. | 310/90 |
| 5,959,380 | A | * | 9/1999 | Gillett et al. | 310/54 |
| 6,455,960 | B1 | * | 9/2002 | Trago et al. | 310/64 |

* cited by examiner

*Primary Examiner* — Dang Le
(74) *Attorney, Agent, or Firm* — WPAT, PC; Justin King

(57) ABSTRACT

A heat dissipating device of an electromotor is a composite cooling device driven in a powerless manner and used for stirring a cooling liquid applied on a surface of a casing of the electromotor. The heat dissipating device includes a pair of bearings fitted on the casing, and a roller disposed at outer ring seats of the pair of bearings. The roller has a sealed chamber therein, the chamber covers a surface of the casing located in a disposition region of the bearings, and at least one outer blade is disposed outside the roller. Thereby, composite heat dissipating of liquid cooling and air cooling of the electromotor is implemented with a cooling liquid injected into the chamber of the roller and a wind force applied on the outer blade.

13 Claims, 4 Drawing Sheets

HEAT DISSIPATING DEVICE OF AN ELECTROMOTOR

CROSS-REFERENCE TO RELATED APPLICATION

This application claims the benefit of Taiwan Patent Application No. 098133145, filed on Sep. 30, 2009, which is hereby incorporated by reference for all purposes as if fully set forth herein.

BACKGROUND OF THE INVENTION

1. Field of Invention

The invention relates to a heat dissipating device of an electromotor, and more particularly to a composite heat dissipating device with interactive actions of liquid cooling and air cooling of an electromotor.

2. Related Art

As a conventional electromotor generates high heat during operation, a heat dissipating device needs to be disposed on a machine body to reduce the operating temperature, and the commonly used heat dissipating devices are generally an air cooling type or a liquid cooling type heat dissipating devices.

The air-cooling type electromotor is the most popular. Heat dissipating fins are usually disposed on the casing of the electromotor, to improve heat dissipation efficiency in a manner of increasing the contact area between the heat generation source and the cooling air. However, this heat dissipation technology largely relies on conditions such as the ambient temperature, ventilation performance, and ventilation rate of the heat ambient fins. If the conditions are undesirable, the heat dissipation efficacy is not obvious, and the high heat generated by the electromotor still remains on the surface of the heat dissipating fins, wherein the high heat may cause damages to the electromotor due to overheating. To solve this problem, the user generally utilises a heat dissipating fan driven by power to helpfully lower the temperature. However, for this case, in addition to extra power consumption or load, the heat dissipating fan itself also generates heat and causes heat dissipation burden.

In the liquid-cooling type electromotor, the casing is soaked in a liquid, the liquid is pumped by an electric pump, and a heat dissipating device is used to cool the pumped liquid of a flow path so as to improve the heat dissipation performance of the liquid-cooling type electromotor. However, this technology needs to further provide a set of actuating pumping apparatus and heat dissipating device, so that the cost is increased and more power is consumed. Besides, the electric pump itself also generates heat to cause heat dissipating burden, and occupies a space in the equipment due to the pumping apparatus and the heat dissipating device located thereon.

SUMMARY OF THE INVENTION

The invention is directed to a heat dissipating device of an electromotor, which is driven without power and implements a mixed mode of air cooling and liquid cooling.

To achieve the above objective, in a technical solution, the invention provides a heat dissipating device of an electromotor, which includes a pair of bearings and a roller. Each bearing has an inner sleeve and an outer annular seat, and the inner sleeve is hermetically disposed around the casing. The roller is hermetically disposed around the outer annular seats of the pair of bearings. The roller has a sealed chamber therein, wherein a cooling liquid can be injected to the chamber, the chamber covers a surface of the casing, and at least one outer blade is disposed outside the roller.

The invention is characterized in that: the outer blade of the roller can be effectively rotated by the wind force without requiring additional power. In the invention, a rotation action is employed. An inner blade is used to continuously take the liquid contacting the heat source away from the heat source, and bring the liquid at lower temperature to contact the heat source, thereby shortening the heat cycle. Moreover, by using the rotation action, the contact position between the outer blade and the fresh wind is continuously changed to enable each outer blade to continuously contact the fresh wind so as to obtain a desired cooling effect.

BRIEF DESCRIPTION OF THE DRAWINGS

The invention will become more fully understood from the detailed description given herein below for illustration only, and thus are not limitative of the invention, and wherein.

DETAILED DESCRIPTION OF THE INVENTION

Preferred embodiments of the invention are illustrated in detail below with the accompanying drawings.

Figure 1:
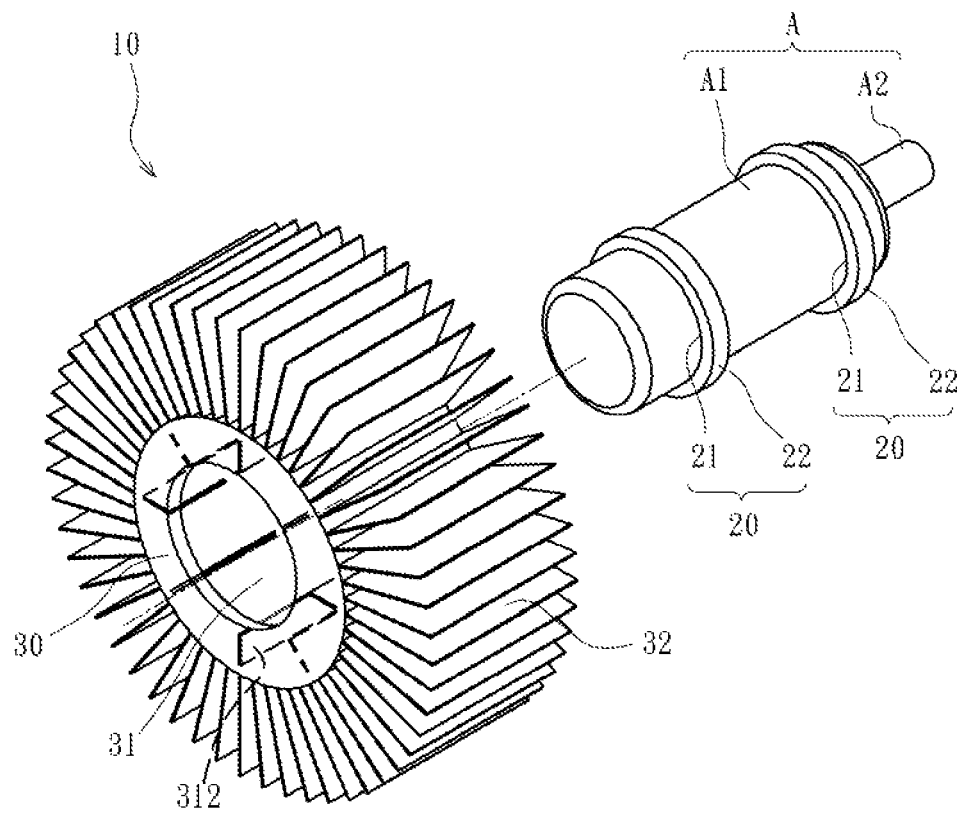
FIG. 1 is a three-dimensional exploded view of a heat dissipating device of an electromotor having an integrally formed roller according to an embodiment of the invention.

FIG. 1 is a three-dimensional exploded view of a heat dissipating device of an electromotor, wherein the heat dissipating device has a roller integrally formed thereon according to an embodiment of the invention. The heat dissipating device 10 in this embodiment is applied to an electromotor A having a casing A1 and a driving shaft A2. The heat dissipating device 10 includes a pair of bearings 20, each having an inner sleeve 21 and an outer annular seat 22. The inner sleeves 21 are hermetically disposed around the casing A1 of the electromotor A, and the inner sleeves 21 and the casing A1 are sealed to achieve a sealing state between the casing A1 and the bearings 20. Further, a roller 30 is hermetically disposed around the outer annular seats 22 of the pair of bearings 20. A sealed chamber 31 is formed in the roller 30, and the chamber 31 covers a surface of the casing A1 located between the two inner sleeves 21 of the pair of bearings 20, so that a cooling liquid B located in the chamber 31 can directly contact a heat source on the surface of the casing A1. In addition, at least one outer blade 32 is disposed outside the roller 30.

Figure 2:
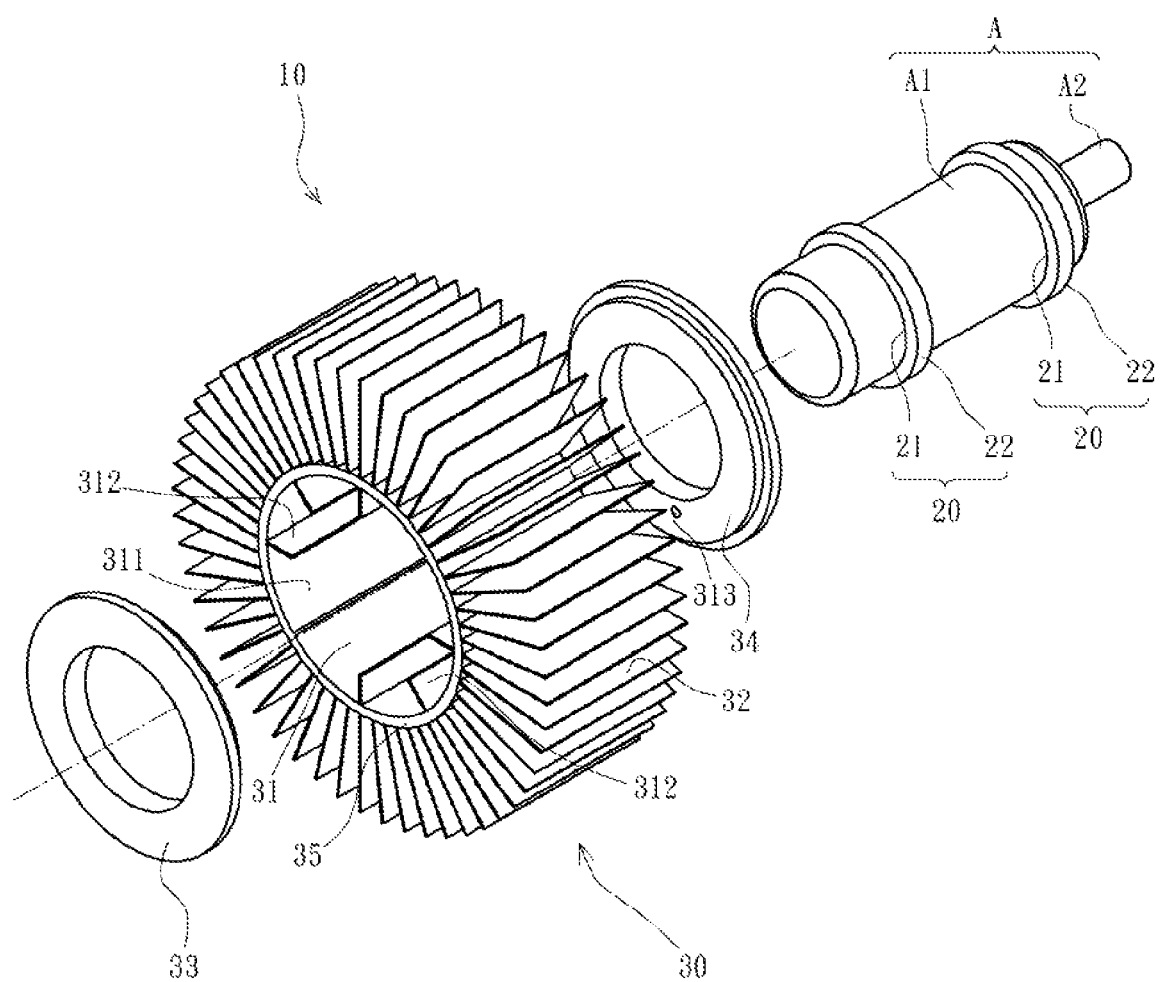
FIG. 2 is a three-dimensional exploded view of a heat dissipating device of an electromotor having an assembled roller according to an embodiment of the invention.
Figure 3:
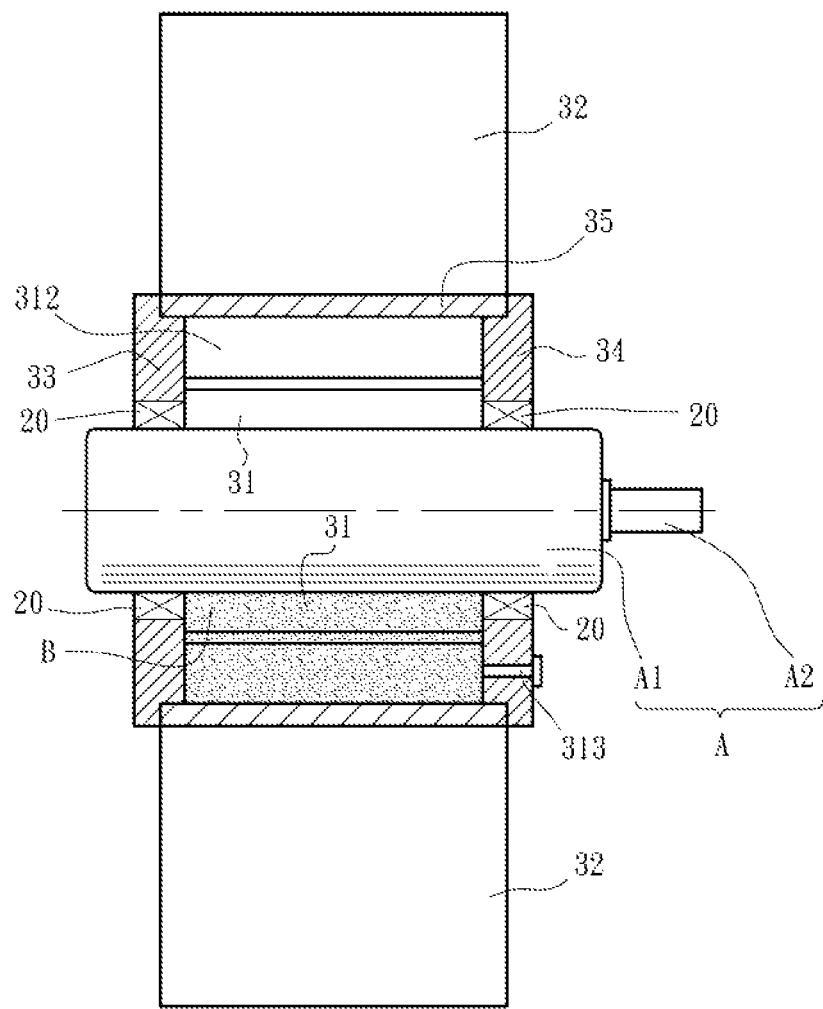
FIG. 3 is a cross-sectional view of an assembly of a heat dissipating device in an axial direction according to an embodiment of the invention.

FIG. 2 is a three-dimensional exploded view of a heat dissipating device of an electromotor, wherein the heat dissipating device has a roller assembled thereon according to another embodiment of the invention, and FIG. 3 is a cross-sectional view of an assembly of a heat dissipating device in an axial direction according to another embodiment of the invention. The difference between this embodiment and the previous one lies is characterized in that, the roller 30 is formed of a top cap 33, a bottom cap 34, and a cylindrical plate 35 having two ends physically connected to the top cap 33 and the bottom cap 34 respectively.

In the above two embodiments, the outer blade 32 may be a spiral blade disposed along an outer diameter of the roller 30, or the outer blades 32 may be a plurality of blades 32 radiating from an axle center of the roller 30. The outer blade 32 and the plate 35 may also be integrally formed.

Figure 4:
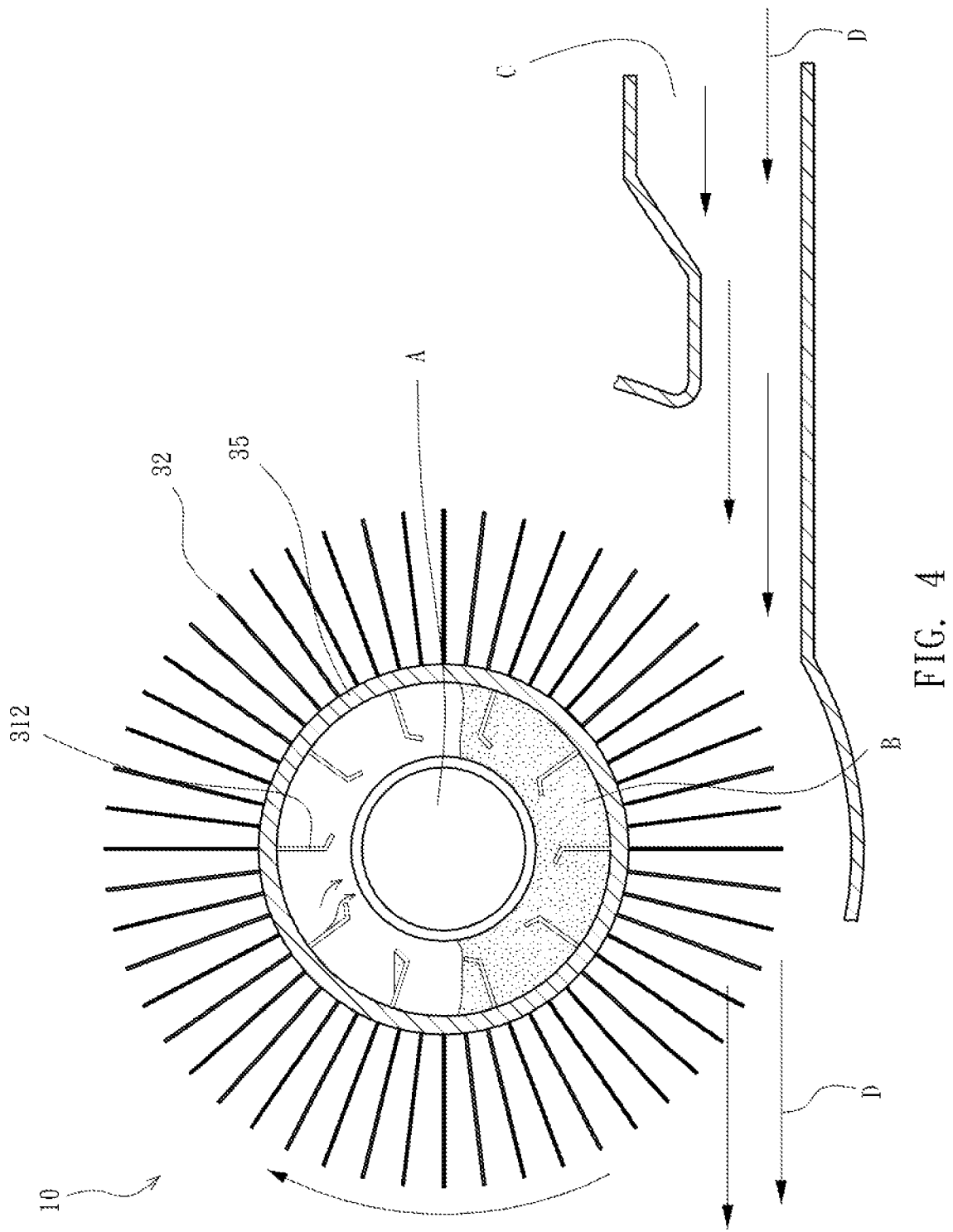
FIG. 4 is a view illustrating an actuation of a heat dissipating device in a radial direction according to an embodiment of the invention.

FIG. 4 is a view illustrating an actuation of a heat dissipating device in a radial direction according to an embodiment of the invention. To improve the efficiency of stirring the cooling liquid B in the chamber 31, at least one inner blade 312 may be further disposed on a wall 311 of the chamber 31 and be protruded towards the chamber 31. Definitely, the inner blade 312 may also be integrally formed with the plate 35, so that when the roller 30 is rotated by introducing an air flow D through a flow guide port C of a device, the inner blade 312 conducts the cooling liquid B to another surface of the casing A1 that is not soaked in the cooling liquid B.

Furthermore, to store the kinetic energy of the roller 30 after rotation, the top cap 33 and/or the bottom cap 34 may be a freewheel.

In addition, for the convenience of injecting the cooling liquid into the roller or replacing the cooling liquid, a liquid filling hole 313 (shown in FIG. 3) communicating with the chamber 31 is provided on the roller.

It should be noted that, the surface of the inner blade 312 and/or the outer blade 32 may be, but not limited to, a concave arc, or formed with a spoon-shaped cutout portion thereon, so as to increase the wind blocking capability or ladling capability and enhance the heat dissipation effect.

In view of the above, the embodiments of the invention are characterized in that: the outer blade of the roller can be effectively rotated by the wind force without requiring additional power (if the outer blade of the roller is not rotated by the wind force, the outer blade of the roller can be rotated by a power of the electromotor itself). In the invention, a rotation action is employed. The inner blade is used to continuously take the liquid contacting the heat source away from the heat source, and bring the liquid at lower temperature to contact the heat source, thereby shortening the heat cycle. Moreover, by using the rotation action, the contact position between the outer blade and the fresh wind is continuously changed to enable each outer blade to continuously contact the fresh wind so as to obtain a desired cooling effect. Definitely, after reading the specification of the invention, persons skilled in the art can better understand other benefits or other objectives defined by the appended claims of the application.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat dissipating device of an electromotor, wherein the electromotor has a casing, the heat dissipating device comprising:

a pair of bearings, each having an inner sleeve and an outer annular seat, wherein the inner sleeve is hermetically disposed around the casing;

a roller hermetically disposed around the outer annular seats of the pair of bearings, wherein the roller comprises a sealed chamber therein, and the chamber covers a surface of the casing between the two inner sleeves of the pair of bearings;

at least one outer blade disposed outside the roller; and a cooling liquid located in the sealed chamber, whereby the cooling liquid directly contacts a heat source on the surface of the casing.

2. The heat dissipating device of the electromotor according to claim 1, wherein the roller comprises a top cap, a bottom cap, and a cylindrical plate having two ends physically connected to the top cap and the bottom cap respectively.

3. The heat dissipating device of the electromotor according to claim 2, further comprising a plurality of outer blades radiating outwards from an axle center of the roller.

4. The heat dissipating device of the electromotor according to claim 2, wherein the roller further comprises at least one inner blade disposed on a wall of the chamber and protruded towards the chamber.

5. The heat dissipating device of the electromotor according to claim 4, wherein the inner blade conducts the cooling liquid to another surface of the casing that is not soaked in the cooling liquid, when the roller is rotated.

6. The heat dissipating device of the electromotor according to claim 2, wherein the top cap or the bottom cap is a freewheel.

7. The heat dissipating device of the electromotor according to claim 2, wherein the outer blade and the plate are integrally formed.

8. The heat dissipating device of the electromotor according to claim 2, wherein the inner blade and the plate are integrally formed.

9. The heat dissipating device of the electromotor according to claim 2, wherein the roller has a liquid filling hole communicating with the chamber, whereby a cooling liquid is injected or replaced.

10. The heat dissipating device of the electromotor according to claim 2, further comprising a cooling liquid located in the chamber directly contacting a heat source on the surface of the casing.

11. The heat dissipating device of the electromotor according to claim 2, wherein the electromotor includes a device having a flow guide port for introducing an air flow, whereby the roller is rotated by the air flow.

12. The heat dissipating device of the electromotor according to claim 2, wherein the outer blade of the roller is rotated by a wind force.

13. The heat dissipating device of the electromotor according to claim 2, wherein the outer blade of the roller is rotated by a power of the electromotor itself.

* * * * *